United States Patent
Honda et al.

(10) Patent No.: US 7,339,764 B2
(45) Date of Patent: Mar. 4, 2008

(54) METHOD OF DESIGNING PATTERNED MAGNETIC RECORDING MEDIUM AND PATTERNED MAGNETIC RECORDING MEDIUM

(75) Inventors: Naoki Honda, Akita (JP); Kazuhiro Ouchi, Minamiakita-gun (JP)

(73) Assignees: Japan Science and Technology Agency, Kawaguchi-shi (JP); Akita Prefecture, Akita-shi (JP)

( * ) Notice: Subject to any disclaimer, the term of this patent is extended or adjusted under 35 U.S.C. 154(b) by 0 days.

(21) Appl. No.: 11/689,851

(22) Filed: Mar. 22, 2007

(65) Prior Publication Data
US 2007/0159721 A1 Jul. 12, 2007

Related U.S. Application Data

(63) Continuation of application No. PCT/JP2005/020317, filed on Nov. 4, 2005.

(30) Foreign Application Priority Data

Nov. 4, 2004 (JP) ............................. 2004-320864
Jun. 9, 2005 (JP) ............................. 2005-169610

(51) Int. Cl.
*G11B 5/74* (2006.01)
(52) U.S. Cl. ...................................... 360/131; 360/135
(58) Field of Classification Search ..................... None
See application file for complete search history.

(56) References Cited

U.S. PATENT DOCUMENTS 6,500,497 B1 * 12/2002 Wang et al. ................. 427/528
7,166,997 B2 * 1/2007 Ju et al. ................. 324/244.1
2003/0113524 A1 * 6/2003 Klemmer et al. ........... 428/209
2005/0157597 A1 * 7/2005 Sendur et al. ........... 369/13.55

FOREIGN PATENT DOCUMENTS

| JP | 2004-110926 A | 4/2004 |
|---|---|---|
| JP | 2004-152367 A | 5/2004 |
| JP | 2004-220680 A | 8/2004 |

OTHER PUBLICATIONS

Charles T. Rettner, et al., "Patterning of Granular Magnetic Media with a Focused Ion Beam to Produce Single-Domain Islands at >140 Gbit/in$^2$", IEEE Transactions on Magnetics, vol. 37, No. 4, Jul. 2001, pp. 1649-1651.

* cited by examiner

Primary Examiner—A. J. Heinz
(74) Attorney, Agent, or Firm—Oblon, Spivak, McClelland, Maier & Neustadt, P.C.

(57) ABSTRACT

A method of designing a patterned magnetic recording medium including a magnetic film with perpendicular magnetic anisotropy which is patterned into dots form includes steps of setting values to dot pattern periods $P_x$ and $P_y$, a thickness "t", a thermal stability factor $K_n$, a minimum inter-dot spacing $S_0$, and a maximum recording field $H_m$, setting an initial value of a saturation magnetization $M_s$, finding a nucleation field for magnetization reversal $H_n$ and estimating a coercivity $H_c$ and a saturation field $H_s$, and repeating the steps given above so as to make the saturation field $H_s$ lower than the maximum recording field $H_m$, thereby determining the magnetic properties $M_s$, $H_n$ and $H_c$ satisfying a desired condition.

5 Claims, 12 Drawing Sheets

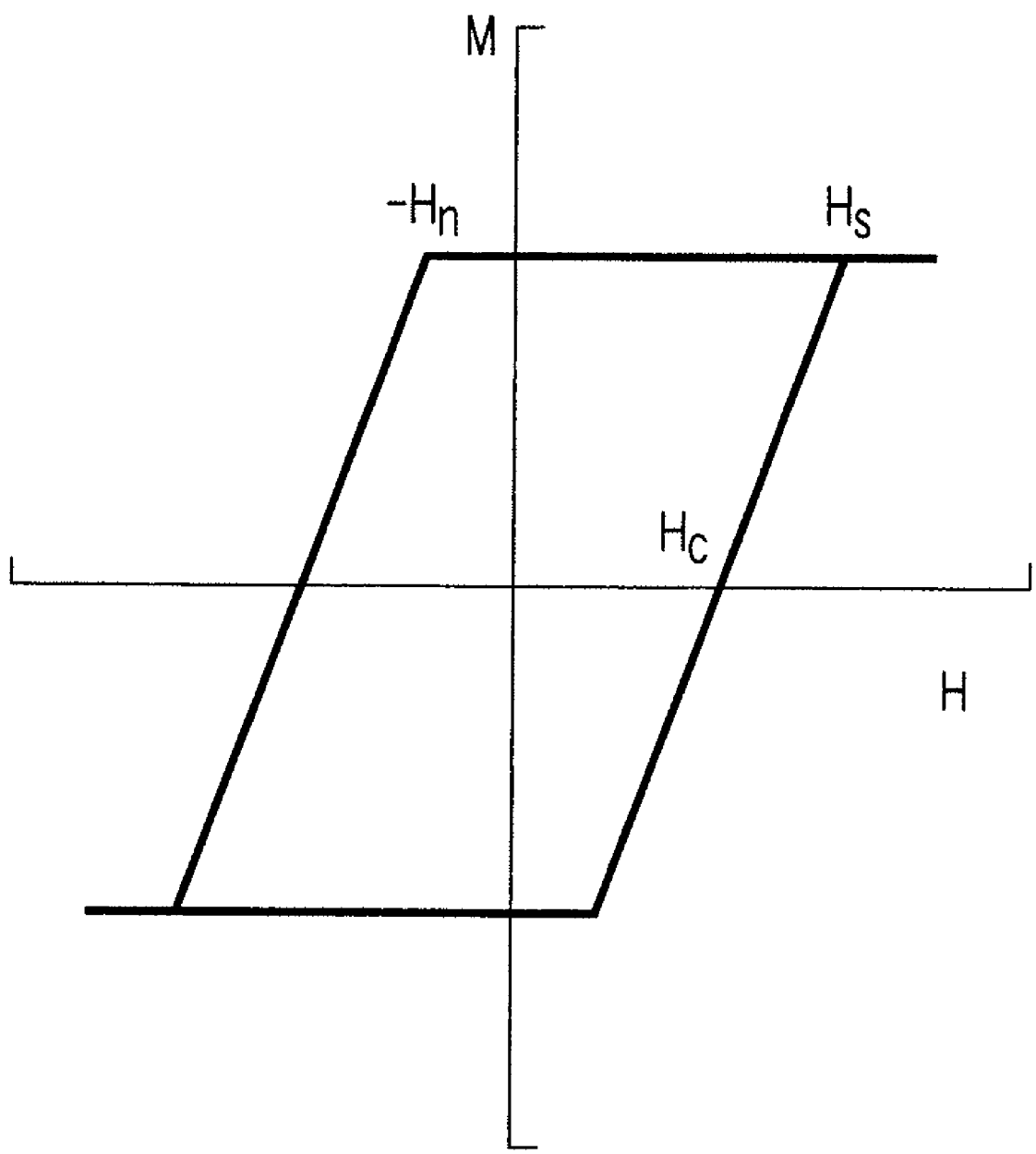
F I G. 1

METHOD OF DESIGNING PATTERNED MAGNETIC RECORDING MEDIUM AND PATTERNED MAGNETIC RECORDING MEDIUM

CROSS-REFERENCE TO RELATED APPLICATIONS

This is a Continuation Application of PCT application Ser. No. PCT/JP2005/020317, filed Nov. 4, 2005, which was published under PCT Article 21(2) in Japanese.

This application is based upon and claims the benefit of priority from prior Japanese Patent Applications No. 2004-320864, filed Nov. 4, 2004; and No. 2005-169610, filed Jun. 9, 2005, the entire contents of both of which are incorporated herein by reference.

BACKGROUND OF THE INVENTION

1. Field of the Invention

The present invention relates to a method of designing a patterned magnetic recording medium having a patterned magnetic film and also relates to a patterned magnetic recording medium. The patterned magnetic recording medium of the present invention is applied to a magnetic recording apparatus mounted on various recording apparatuses such as computers and video recorders.

2. Description of the Related Art

A perpendicular magnetic recording system attracts attention as a technology for improving the recording density of a magnetic recording medium. In this system, a magnetic thin film of a fine particle structure having perpendicular magnetic anisotropy is used as the recording medium, and information is recorded in the recording medium by a magnetic head in a form of fine magnetization patterns. In the perpendicular magnetic recording system, adjacent magnetizations with a magnetization transition interposed therebetween are coupled antiparallel with each other. Therefore, compared with the longitudinal magnetic recording system, the perpendicular magnetic recording system can maintain a more stable recorded state against thermal magnetic relaxation, making it possible to achieve a higher recording density.

However, it is necessary to reduce the size of the fine particles of the recording medium about one tenth in accordance with decrease in a recording bit length in the perpendicular magnetic recording system, as in the longitudinal magnetic recording medium. In this connection, the magnetic energy of the magnetic particles is decreased so as to bring about influence of the thermal magnetic relaxation. In order to increase the magnetic energy of the magnetic particles, it is effective to increase the magnetic anisotropy of the magnetic material. However, this also increases magnetic field strength required for magnetic reversal in recording, which gives rise to a problem that it is impossible to perform recording using an actual magnetic head.

As a method for breaking through the limit due to the thermal magnetic relaxation phenomenon in the magnetic recording medium, patterned magnetic recording media in which the area of a magnetic dot corresponds to the size of a bit are proposed (Charles T. Rettner, Margaret E. Best and Bruce D. Terris, "Patterning of granular magnetic media with a focused ion beam to produce single-domain islands at >140 Gbit/in$^2$," IEEE Transactions on Magnetics, volume 37, issue 4, pp. 1649-1651, July 2001"; and Tsutomu Aoyama, Isamu Sato and Shunji Ishio, "Fabrication and magnetic properties of patterned magnetic recording media", OYO BUTURI, Vol. 72, No. 3, p. 0298-0303 (2003)). Since the area of a magnetic dot corresponds to the size of a bit, the patterned magnetic recording medium can take significantly high magnetic energy, with the result that the medium can ensure the thermal magnetic stability without increasing the magnetic anisotropy. However, there has not been known to date a method of designing a patterned magnetic recording medium taking comprehensive conditions including the thermal magnetic stability, recording facility, ease of fabrication and shift margin of a write head in the cross track direction in recording into consideration. Also, there has not been known an optimum structure of the patterned magnetic recording medium. In the patterned magnetic recording medium, the track width is reduced and, thus, high tracking accuracy is required. Nevertheless, even in patterned magnetic recording media aimed at an areal recording density of 1 Tbit/in$^2$, it is only studied how to satisfy the thermal magnetic stability and the recording conditions or it is only studied the size of the magnetic dot which satisfies the desired density.

BRIEF SUMMARY OF THE INVENTION

As described above, in the patterned magnetic recording medium, it is necessary to design the magnetic properties, size and thickness of the magnetic film so that the magnetic dot pattern which achieves a desired recording density can provide the thermal magnetic stability, recording facility and ease of fabrication as well as the shift margin for the write head in the cross track direction in recording can be widened.

An object of the present invention is to provide a method of designing a patterned magnetic recording medium which makes it possible to easily determine the magnetic properties of a magnetic film so that a magnetic dot pattern which achieves a desired recording density can provide the thermal magnetic stability, recording facility and ease of fabrication as well as the shift margin for the write head in the cross track direction in recording can be widened. Another object of the present invention is to provide a patterned magnetic recording medium satisfying the features noted above.

According to the present invention, there is provided a method of designing a patterned magnetic recording medium comprising a magnetic film with perpendicular magnetic anisotropy which is patterned into dots, comprising steps of:

setting values to dot pattern periods $P_x$ and $P_y$ in an x-direction and in an y-direction, a thickness "t", a thermal stability factor $K_n$, a minimum inter-dot spacing $S_0$, and a maximum recording field $H_m$;

setting an initial value to a saturation magnetization $M_s$;

finding a dot size "a" in the x-direction and a nucleation field for magnetization reversal $H_n$ in accordance with the formulas given below: $a = P_x - S_0$, $H_n = 2K_n * k_B T/(a^2 * M_s * \gamma * t)$, where $k_B$ is the Boltzmann constant, T is an absolute temperature, and $\gamma$ is a ratio of the dot size in the y-direction to the dot size in the x-direction;

finding an inclination $\alpha$ of a perpendicular M-H loop of the magnetic dot with a shape of (a, γa, t) in accordance with the formula given below: $\alpha = 4\pi/(N_d + \Delta H_c/M_s)$, where $N_d$ is a perpendicular demagnetizing factor of the magnetic dot, and $\Delta H_c$ is a distribution broadening of a coercivity $H_c$ in the patterned magnetic recording medium, and estimating the coercivity $H_c = H_n + (4\pi M_s/\alpha)$ and a saturation field $H_s = H_n + (8\pi M_s/\alpha)$; and judging whether the saturation field $H_s$ is lower than the maximum recording field $H_m$, and, if the saturation field $H_s$ is not lower than the maximum recording field $H_m$, increasing the value of the saturation field $M_s$ and repeating the steps given above, thereby determining the magnetic properties of $M_s$, $H_n$ and $H_c$ satisfying the desired condition.

According to the present invention, there is also provided a patterned magnetic recording medium including magnetic dots with perpendicular magnetic anisotropy which are patterned to form a recording track, wherein the magnetic dot has a thickness "t" of 15 nm or less, a dot size "a" in a cross track direction of a half or less of a dot pattern period, a saturation magnetization $M_s$ higher than 650 emu/cm³, a saturation magnetization $H_s$ lower than 18 kOe, and a nucleation field for magnetization reversal $H_n$ (Oe) satisfying the relationship given below:

$$H_n \geq 140 * k_B * 300/M_s V = 4.2 \times 10^4 k_B/M_s V,$$

where $k_B$ is the Boltzmann constant (erg/deg) and V is a volume (cm³) of the magnetic dot.

In the patterned magnetic recording medium of the present invention, it is preferable that the magnetic dot has an anisotropic shape such that a dot size "b" in a down track direction is larger than the dot size "a" in the cross track direction.

BRIEF DESCRIPTION OF THE SEVERAL VIEWS OF THE DRAWING

FIG. 1 shows a perpendicular M-H loop of a perpendicular anisotropy film;

DETAILED DESCRIPTION OF THE INVENTION

Figure 2:
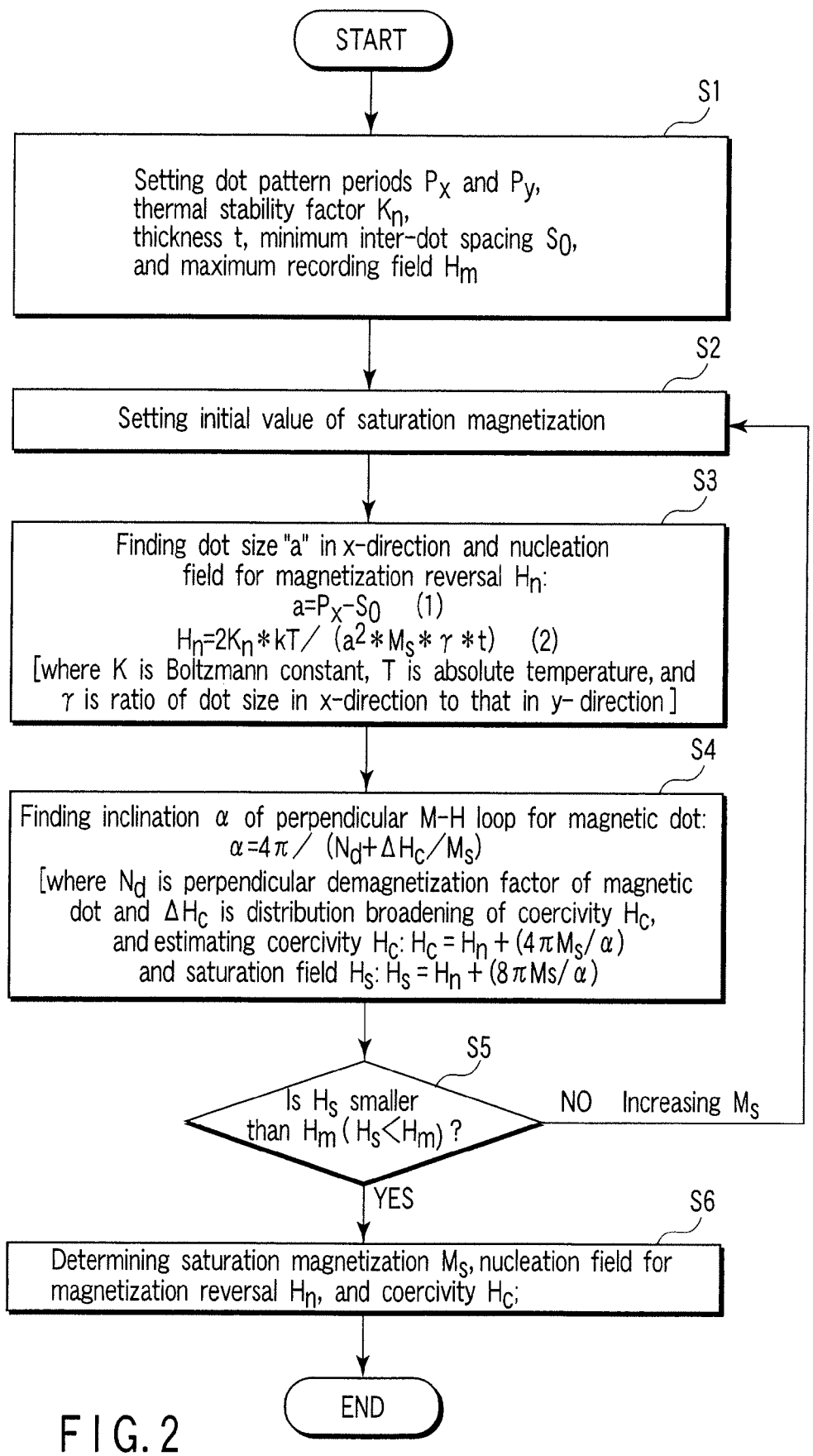
FIG. 2 is a flow chart showing the designing method according to the present invention.

The present invention will be described more in detail below.

In the method of designing a patterned magnetic recording medium of the present invention, firstly, values are set to dot pattern periods $P_x$ and $P_y$ in x- and y-directions that determine the areal recording density, a thermal stability factor $K_n$ that determines thermal magnetic stability, and a thickness "t" and a minimum inter-dot spacing $S_0$ that determine ease of fabrication of the dot pattern. Then, an initial value is set to a saturation magnetization $M_s$.

Next, a nucleation field for magnetization reversal $H_n$ (more precisely, a nucleation field for remanent magnetization reversal $H_{rn}$) satisfying the thermal magnetic properties is determined, and then an anisotropy field $H_k$ satisfying that is determined. Further, a saturation field $H_s$ is determined, and then $M_s$, $H_c$, and $H_n$ (or $H_{rn}$) are determined such that $H_s$ becomes not larger than a maximum recording field $H_m$. Here, a perpendicular M-H loop of a perpendicular anisotropy film is shown in FIG. 1. FIG. 1 indicates the nucleation field for magnetization reversal $H_n$, the coercivity $H_c$ and the saturation field $H_s$. A simple method of determining these magnetic properties will be described below.

First, the dot size "a" in the x-direction and the nucleation field for magnetization reversal $H_n$ are determined by the formulas given below:

$$a = P_x - S_0, \text{ and}$$

$$H_n \geq 2K_n * k_B T/(a^2 * M_s * \gamma * t), \text{ or}$$

$$H_n \geq 2K_n * k_B T/(M_s V),$$

where $k_B$ is the Boltzmann constant, T is an absolute temperature, γ is a ratio of the dot size in the y-direction relative to the dot size in the x-direction, and V is a volume of a magnetic dot.

Next, an inclination α of a perpendicular M-H loop of the magnetic dot having the shape of (a, γa, t) is determined by the formula given below:

$$\alpha = 4\pi(dM/dH) - 4\pi/(N_d + \Delta H_c/M_s),$$

where $N_d$ is a perpendicular demagnetizing factor of the magnetic dot, and $\Delta H_c$ is a distribution broadening of the coercivity $H_c$ in the patterned magnetic recording medium.

Further, a coercivity $H_c=H_n+(4\pi M_s/\alpha)$ and a saturation field $H_s=H_n+(8\pi M_s/\alpha)$ are estimated.

It should be noted that $H_c$ and $H_s$ can be determined by a method comprising: setting a value to an anisotropy field $H_k$; finding a M-H loop or a remanent magnetization curve through simulation; determining a nucleation field for magnetization reversal $H_n$ or a nucleation field for remanent magnetization reversal $H_{rn}$; adjusting $H_k$ so that $H_n$ or $H_{rn}$ has a value equal to that obtained by the formula given above; and finding again a M-H loop through simulation from which $H_c$ and $H_s$ are determined.

Then, it is judged whether or not the resultant saturation field $H_s$ is lower than the maximum recording field $H_m$. If the saturation field $H_s$ is lower than the maximum recording field $H_m$, the magnetic properties $M_s$, $H_n$, $H_c$ satisfying the desired conditions are determined, and then the operation is ended. On the other hand, if the saturation field $H_s$ is not lower than the maximum recording field $H_m$, the value of the saturation magnetization $M_s$ is increased and the aforementioned steps are repeated until the saturation field $H_s$ becomes lower than the maximum recording field $H_m$ so as to determine the magnetic properties $M_s$, $H_n$ and $H_c$ satisfying the desired conditions, and then the operation is ended.

FIG. 2 shows the present invention in a form of a flow chart. The method of designing a patterned magnetic recording medium will be described more specifically with reference to FIG. 2.

(S1) If an areal recording density of 1 Tbit/in² is to be achieved with a dot pattern in a square lattice, the pattern periods should be $P_x=P_y=25$ nm. It is known that, in order to ensure sufficient thermal magnetic stability for three years or more, the thermal stability factor $K_n=E_m/k_BT$ (where $E_m$ is the magnetic energy of the magnetic dot) should take a value of 60 to 80 (see Naoki HONDA and Kazuhiro OUCHI, "Time Dependence of Magnetic Properties in Perpendicular Recording Media, "IEICE Trans. Electron., Vol. E80-C, No. 9, pp. 1180-1186, September 1997"). In view of processing of the magnetic film, it is considered that the limiting values for the thickness "t" and the minimum inter-dot spacing $S_0$ would be approximately 10 nm and 10 nm, respectively.

(S2) An initial value is set to the saturation magnetization $M_s$. The initial value can be set at any value. For example, a Co—Pt—Cr alloy is used for the magnetic film, the initial value of $M_s$ would be set at 400 to 600 emu/cm³.

(S3) The size "a" in the x-direction of the magnetic dot and the nucleation field for magnetization reversal $H_n$ are determined in accordance with the formulas given below.

$$a=P_x-S_0 \quad (1),$$

$$H_n=2K_n*k_BT/(a^2*M_s*\gamma*t) \quad (2),$$

where $k_B$ is the Boltzmann constant, T is an absolute temperature, and $\gamma$ is a ratio of the dot size in the y-direction relative to the dot size in the x-direction. The value of $\gamma$ is unity in the case of the square magnetic dot. It should be noted that the absolute temperature T takes a value ranging from room temperature to an upper limit of 70° C., to which the magnetic recording medium would be actually used, in an absolute temperature.

(S4) The inclination $\alpha$ of the perpendicular M-H loop of the magnetic dot is determined in accordance with the formula given below:

$$\alpha=4\pi(dM/dH)-4\pi/(N_d+\Delta H_c/M_s),$$

where $N_d$ is a perpendicular demagnetizing factor of the magnetic dot, and $\Delta H_c$ is a distribution broadening of the coercivity $H_c$ in the patterned magnetic recording medium.

The perpendicular demagnetizing factor $N_d$ can be estimated easily by approximating a rectangular prism as an ellipsoid. Using an equation $\epsilon=t/(\gamma a^2)^{1/2}$, $N_d$ can be estimated as follows depending on the conditions of $\epsilon>1$, $\epsilon=1$ and $\epsilon<1$. That is, for $\epsilon>1$, $N_d=4\pi[1/(\epsilon^2-1)]\{[\epsilon/(\epsilon^2-1)^{1/2}]\ln(\epsilon+(\epsilon^2-1)^{1/2})-1\}$; for $\epsilon=1$, $N_d=4\pi/3$; and for $\epsilon<1$, $N_d=4\pi-4\pi\{[\epsilon/(1-\epsilon^2)^{3/2}]\sin^{-1}(1-\epsilon^2)^{1/2}-[\epsilon^2/(1-\epsilon^2)]\}$. See, for example, Soshin Chikazumi, "Physics of ferromagnetic material (first volume)", published by Shokabo, Tokyo, 1978, page 15.

Also, the distribution broadening $\Delta H_c$ of the coercivity $H_c$ can be estimated at about 20% of the nucleation field for magnetization reversal $H_n$.

Then, the coercivity $H_c$ and the saturation field $H_s$ are estimated by $H_c=H_n+(4\pi M_s/\alpha)$ and $H_s=H_n+(8\pi M_s/\alpha)$.

As described above, $H_c$ and $H_s$ can be determined in this step by a method comprising: setting a value to an anisotropy field $H_k$; finding a M-H loop through simulation; determining a nucleation field for magnetization reversal $H_n$; adjusting $H_k$ so that $H_n$ comes to the set value.

(S5) It is judged whether or not the resultant saturation field $H_s$ is lower than the maximum recording field $H_m$. If the saturation field $H_s$ is lower than the maximum recording field $H_m$, the magnetic properties $M_s$, $H_n$ and $H_c$ satisfying the desired conditions are determined, and then the operation is ended. On the other hand, if the saturation field $H_s$ is not lower than the maximum recording field $H_m$, the operation is brought back to Step S2 so as to increase appropriately the value of the saturation magnetization $M_s$, and the subsequent steps are repeated until the saturation field $H_s$ becomes lower than the maximum recording field $H_m$ so as to determine the magnetic properties $M_s$, $H_n$ and $H_c$ satisfying the desired conditions, and then the operation is ended. In such a manner, the magnetic properties can be designed. That is, it is possible to determine the magnetic properties (the saturation magnetization $M_s$, the nucleation field for magnetization reversal $H_n$ and the coercivity $H_c$) of a patterned recording medium having a desired recording density and satisfying thermal magnetic stability as well as recording and processing facility.

As described above, according to the present designing method, it is possible to find easily the magnetic properties and the size of a patterned magnetic recording medium having a desired recording density and satisfying thermal magnetic stability as well as recording and processing facility.

Incidentally, it is preferable in the present invention to design a patterned magnetic recording medium under the conditions that the thickness "t" is 15 nm or less, the minimum inter-dot spacing $S_0$ in the cross track direction is larger than a half of the dot pattern period, and the saturation magnetization $M_s$ is larger than 650 emu/cm³. The lower limit of the thickness "t" is defined by a thickness at which the magnetic film can function effectively. The lower limit is preferred to be 2 nm or more. The upper limit of the ratio of the minimum inter-dot spacing $S_0$ to the dot pattern period is defined by a range in which the desired recording density can be provided under the condition that the minimum dot size satisfying practical magnetic properties is set at 5 nm×5 nm. The upper limit of the saturation magnetization $M_s$ is not particularly limited and is limited by the maximum saturation magnetization of the magnetic material that can be used.

EXAMPLES

The present invention will be described based on Examples.

Example 1

An example of designing a patterned magnetic recording medium including square magnetic dots and having an areal recording density of 1 Tbit/in² will be described.

First, the pattern periods were set at $P_x=P_y=25$ mm, the thermal stability factor $K_n=E_m/k_BT$ (where $E_m$ is a magnetic energy of the magnetic dot) for ensuring the thermal magnetic stability for three years or more was set at 60, the minimum inter-dot spacing $S_0$ was set at 18 nm, and the maximum recording field $H_m$ was set at 20 kOe. Further, the initial value of the saturation magnetization $M_s$ was set at 600 emu/cm³.

Next, the size "a" of the magnetic dot and the nucleation field for magnetization reversal $H_n$ were determined in accordance with the formulas (3) and (4) given below, respectively:

$$a=P_x-S_0=7 \text{ (nm)} \quad (3),$$

$$H_n=2K_n*k_BT/(a^2*M_s*\gamma*t) \quad (4),$$

where $k_B$ is the Boltzmann constant, T is an absolute temperature, $\gamma$ is a ratio of the dot size in the y-direction relative to the dot size in the x-direction. Since the dot shape was square, $\gamma=1$. The value of $H_n$ required for satisfying the condition of $K_n \geq 60$ was 15 kOe at 293 K (20° C.) of "T".

Next, the inclination $\alpha$ of the perpendicular M-H loop of the magnetic dot shaped to have 7 nm of the size in the x-direction, 7 nm of the size in the y-direction, and 11 nm of the thickness was determined in accordance with the formula given below:

$$\alpha=4\pi/(N_d+\Delta H_c/M_s),$$

where $N_d$ is a perpendicular demagnetizing factor of the magnetic dot, and $\Delta H_c$ is a distribution broadening of the coercivity $H_c$ in the patterned magnetic recording medium. Here, the perpendicular demagnetizing factor $N_d$ was estimated by approximating a rectangular prism as a spheroid. That is, where $\epsilon=t/(\gamma a^2)^{1/2}$, then $\epsilon>1$, so $N_d$ was found to be 2.8 in accordance with the formula given below:

$$N_d=4\pi[1/(\epsilon^2-1)]\{[\epsilon/(\epsilon^2-1)^{1/2}] \ln(\epsilon+(\epsilon^2-1)\}.$$

Also, the distribution broadening $\Delta H$ of the coercivity $H_c$ was set at 20% of $H_n$. Using these values, the value of $\alpha$, where $\alpha=4\pi/(N_d+\Delta H_c/M_s)$, was found to be 1.6. Further, the coercivity $H_c$ and the saturation field $H_s$ were estimated from the formulas of $H_c=H_n+(4\pi M_s/\alpha)$ and $H_s=H_n+(8\pi M_s/\alpha)$, respectively. As a result, $H_c$ was estimated at 19.7 kOe and $H_s$ was estimated at 24.4 kOe.

Since the saturation field $H_s$ thus determined was higher than the target maximum recording field $H_m$ of 20 kOe, it was found necessary to increase the saturation magnetization $M_s$.

Then, the operation was brought back to S2 in FIG. 2, and the value of $M_s$ was reset at 700 emu/cm³ so as to determine again the values of $H_n$, $\alpha$, $H_c$, and $H_s$. As a result, they were found to be 12.9 kOe, 1.9, 17.4 kOe and 21.9 kOe, respectively. Since the condition of $H_s<H_m$ had not yet been satisfied, it was found necessary to further increase the saturation magnetization $M_s$.

Then, the operation was brought back to S2 in FIG. 2, and the value of $M_s$ was reset at 850 emu/cm³ so as to determine again $H_n$, $\alpha$, $H_c$, and $H_s$. As a result, $H_n$, $\alpha$, $H_c$, and $H_s$ were found to be 10.6 kOe, 2.4, 15.1 kOe and 19.6 kOe, respectively. Since the condition of $H_s<H_m$ had been satisfied in this case, the magnetic properties of $M_s$, $H_n$ and $H_c$ could be determined.

That is, it was possible to design a patterned magnetic recording medium, under the conditions of the pattern period of 25 mm, the dot size of 7 nm×7 nm and the thickness of 11 nm, to have the magnetic properties of $M_s=850$ emu/cm³, $H_n=10.6$ kOe and $H_c=15.4$ kOe. This represents the specification of a patterned magnetic recording medium having a desired recording density, which satisfies the thermal magnetic stability as well as the recording and processing facility.

It should be noted that the magnetic materials satisfying the conditions given above include, for example, a Co—Pt alloy such as Co—Pt—Cr alloy and a Fe—Pt ordered alloy.

It is known that the Co—Pt alloy such as the Co—Pt—Cr alloy with an adjusted composition can be adjusted to has a saturation magnetization $M_s$ in a range of about 300 to 1400 emu/cm³ and a magnetic anisotropy constant Ku, which is required for achieving a high coercivity $H_c$ and a high remanent coercivity $H_{rc}$, in a range of about $5 \times 10^5$ to $1.4 \times 10^7$ erg/cm³. It is also known that the particular alloy exhibits an anisotropy field $H_k$ (=$2Ku/M_s$) of 25 kOe or more even with the saturation magnetization $M_s$ of 1,000 emu/cm³. Thus, the particular alloy has magnetic properties sufficient for realizing the design given above.

It is known that the Fe—Pt ordered alloy can exhibit a saturation magnetization $M_s$ of 1,000 emu/cm³ or more, a magnetic anisotropy constant Ku of $5 \times 10^7$ erg/cm³ or less, and an anisotropy field $H_k$ of 100 kOe or more. Thus, the particular alloy has magnetic properties sufficient for realizing the design given above.

Next, the specification of the magnetic properties of the patterned magnetic recording medium designed as described above was examined by micromagnetic simulation. The simulation software used was "Advanced Recording Model, ver. 6" available from Euxine Technologies LLC, Dayton, Ohio, USA. A perpendicular M-H loop was obtained by simulation under the conditions that square dots each sized at 7 nm square and having a thickness of 11 nm were arrayed to form a lattice of 64×64 with an inter-dot spacing set at 18 nm, the square dots having the saturation magnetization $M_s$ of 850 emu/cm³, a dispersion of the perpendicular anisotropy field $H_k$ of 10%, and an orientation dispersion of the anisotropic axis of 1.5°. In this case, the soft underlayer used for increasing the recording field was incorporated as a mirror imaging layer. Also, the calculation was performed using the energy balance method, with the time dependence not taken into consideration. Therefore, the resultant M-H loop could be regarded as magnetization behavior within a short period of time corresponding to the recording process.

The simulation in which the perpendicular anisotropy field $H_k$ was set at 19 kOe provided the coercivity $H_c$ of 14.7 kOe, the loop inclination $\alpha$ of 2.1, the nucleation field for magnetization reversal $H_n$ of 9.6 kOe, and the saturation field $H_s$ of 19.8 kOe. The magnetic properties thus obtained were close to the values determined as described above.

Example 2

An example of designing a patterned magnetic recording medium including square magnetic dots and having an areal recording density of 1 Tbit/in² under a more practical condition that a maximum recording field $H_m$ is set at 18 kOe will be described.

As in Example 1, the pattern periods were set at $P_x=P_y=25$ mm, the thermal stability factor $K_n=E_m/k_BT$ was set at 60, the thickness "t" was set at 11 nm, and the minimum inter-dot spacing $S_0$ was set at 18 nm. The initial value of the saturation magnetization $M_s$ was set at 600 emu/cm³ also in this Example.

Under the conditions, the nucleation field for magnetization reversal $H_{rn}$ required for achieving the condition of $K_n \geq 60$ at 293 K (20° C.) of "T" was found to be 15 kOe from formulas (3) and (4).

Next, the inclination $\alpha=4\ \pi/N_d+\Delta H_c/M_s$ of the perpendicular M-H loop of the magnetic dot having a shape of 7 nm×7 nm×11 nm was determined, and further $H_c$ and $H_s$ were estimated. As a result, it was found that $H_c=19.7$ kOe and $H_s=24.4$ kOe. Since the saturation magnetization $H_s$ was significantly higher than the assumed maximum recording field $H_m=18$ kOe, it could be found that it was necessary to increase more the saturation magnetization $M_s$.

Then, the value of $M_s$ was reset at 1050 emu/cm³ so as to determine again $H_n$, $H_c$, and $H_s$, with the result that $H_n=8.6$ kOe, $H_c=13.2$ kOe and $H_s=17.9$ kOe. That is, it was possible to design a patterned magnetic recording medium, under the conditions of the pattern period of 25 mm, the dot size of 7 nm×7 nm and the thickness of 11 nm, to have the magnetic properties of $M_s=1050$ emu/cm³, $H_n=8.6$ kOe and $H_c=13.2$ kOe.

Example 3

An example of designing patterned magnetic recording media including square magnetic dots having various sizes and having an areal recording density of 1 Tbit/in² which were examined for saturation magnetization $M_s$ dependence of the saturation field $H_s$ will be described.

Figure 3:
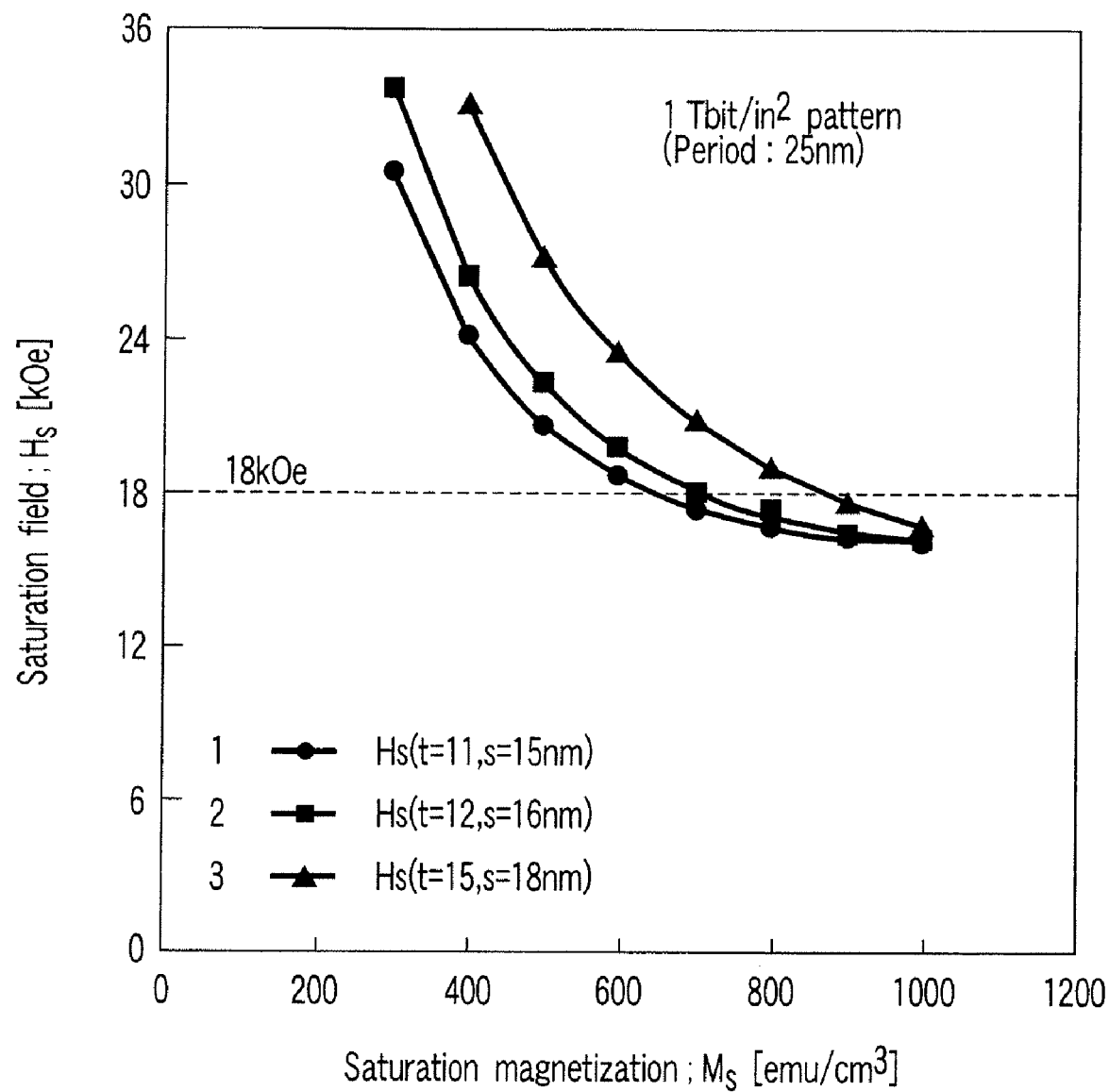
FIG. 3 is a graph showing saturation magnetization $M_s$ dependence of saturation field $H_s$ in a patterned magnetic recording medium including square magnetic dots of various sizes.

The pattern period was set at 25 nm, the thickness "t" was set at 11 to 15 nm, and the inter-dot spacing $S_0$ was set at 15 to 16 nm. On the other hand, the thermal stability factor $K_n=E_m/k_BT$ was set at 70 and the absolute temperature was set at 343 K (70° C.), which were severer conditions than those for Example 1. Then, the variation of the saturation magnetization $M_s$ depending on the saturation field $H_s$ was determined successively. FIG. 3 is a graph showing the $M_s$ dependence of $H_s$ in the three cases in which the thickness "t" and the inter-dot spacing $S_0$ were set as follows:

t=11 nm, $S_0$=15 nm; (a)

t=12 nm, $S_0$=16 nm, and (b)

t=15 nm, $S_0$=18 nm. (c)

It can be seen that, if the saturation magnetization $M_S$ is increased to exceed 650 emu/cm³, there is a region in which the saturation magnetization $H_s$ can be designed at a value smaller than 18 kOe according to the method of the present invention within a range in which the thickness "t" is 15 nm or less and the inter-dot spacing $S_0$ is larger than a half of the dot pattern period.

If the thickness "t" can be set at a value of 15 nm or less, the etching process can easily be performed in pattern forming. Also, if the inter-dot spacing can be set at a value larger than a half of the pattern period, it is possible to moderate the limitation due to resolution in fine processing.

Example 4

A patterned magnetic recording medium including magnetic dots having an anisotropic shape such that the dot size "a" in the cross track direction is not larger than a half of the dot pattern period in the cross track direction and that the dot size "b" in the down track direction is larger than the dot size "a" in the cross track direction will be described.

The patterned magnetic recording medium in this Example has an effect give below by defining that the magnetic dot has the dot size in the cross track direction not larger than a half of the dot pattern period in the cross track direction: (1) The medium can suppress influence to the adjacent tracks in recording. Further, the patterned magnetic recording medium in this Example has effects give below by defining that the magnetic dot has an anisotropic shape such that the dot size in the down track direction is larger than the dot size in the cross track direction: (2) When the volume of the magnetic dot with the anisotropic shape is increased compared with the square dot, the medium can suppress the required field for magnetization reversal, while maintaining the thermal magnetic stability; (3) When the thickness of the magnetic dot with the anisotropic shape is reduced compared with the square dot with the same volume as the square dot retained, the field exerted from the magnetic head to the medium can be increased, which makes the designing of the head easier; and (4) The medium including the magnetic dots having an anisotropic shape produces a difference in the remanent coercivity between the down track direction and the cross track direction, making it possible to increase a shift margin of the write head in the cross track direction.

Figure 4:
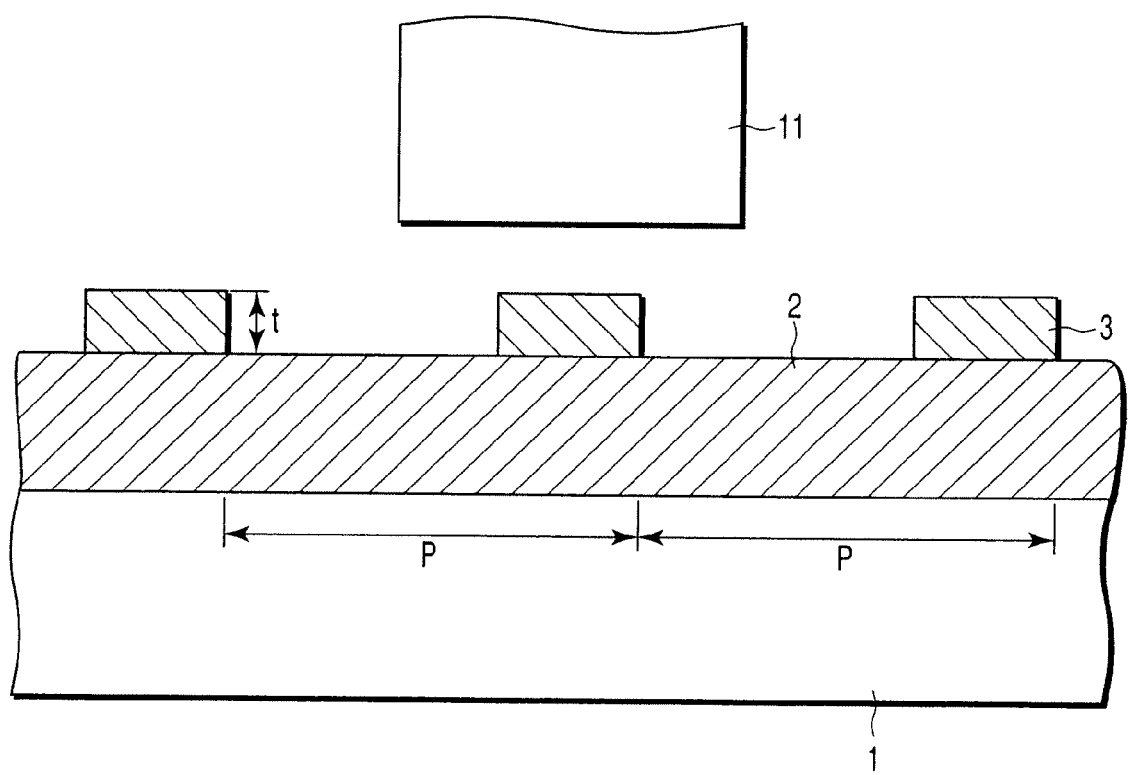
FIG. 4 is a cross-sectional view showing the patterned magnetic recording medium and the magnetic head in Example 4.

FIG. 4 is a cross-sectional view schematically showing the patterned magnetic recording medium in this Example. In FIG. 4, a soft magnetic underlayer 2 is formed on a substrate 1, and magnetic dots 3 made of a perpendicular recording layer are regularly formed at a period P on the soft underlayer 2. The magnetic dots are regularly arrayed two-dimensionally so as to form recording tracks. FIG. 4 shows only the substrate, the soft underlayer and the magnetic dots for explanation, but an additional layer may be provided. For example, an underlayer may be provided between the substrate and the soft underlayer, and an intermediate layer may be provided between the soft underlayer and the magnetic dots. A non-magnetic material may be filled between the magnetic dots. A protective layer and a lubricant layer are generally formed on the magnetic dots.

The procedure for designing the patterned magnetic recording medium in this Example on the basis of the micromagnetic simulation will be described.

As already described with reference to FIG. 2, in designing a patterned magnetic recording medium, the values are first set to the dot pattern periods $P_x$ and $P_y$ (where the down track direction is the x-direction and the cross track direction is the y-direction) that determine an areal recording density, the saturation magnetization $M_s$, the thermal stability factor $K_n$ that determines thermal magnetic stability, and the thickness "t" that limits the magnetic field exerted from the magnetic head to the medium.

Firstly, the dot pattern periods $P_x$ and $P_y$ are set at 25 nm for the square lattice dots having a desired areal recording density of 1 Tbit/in².

Next, a value is set to the thermal stability factor $K_n$ that determines the thermal magnetic stability. When $H_{rn}$ denotes a nucleation field for perpendicular remanent magnetization reversal and V denotes a volume of the magnetic dot, the thermal stability factor $K_n$ is expressed by the formula (A) given below:

$$(1/2)M_s H_{rn} V / k_B T > K_n \quad (A),$$

where $k_B$ is the Boltzmann constant, and T is an absolute temperature. The numerator on the left side of formula (A) is the magnetic energy $E_m$ ($E_m = (1/2)M_s H_{rn} V$) of the magnetic dot. The left side of formula (A) can also be expressed by $E_m/k_B T$. The denominator of the left side of formula (A) is thermal agitation energy. If the thermal stability factor $K_n$ is set at 60 or more, the thermal magnetic stability for three years or more at the set room temperature would be ensured. In other words, the bit error rate due to the thermal agitation is made $10^{-5}$ or less (see IEICE Trans. Electron., Vol. E80-C, No. 9, pp. 1180-1186, September 1997 referred to above. Used herein is, however, a nucleation field for magnetization reversal in remanent magnetization $H_{rn}$, which provides a more accurate criterion). In the simulation, $K_n$ at T=300K is set at 70 or more in order to ensure thermal magnetic stability at a higher temperature of 70° C. that is required for an actual drive. As a result, the condition of $K_n > 60$ can be ensured even at 70° C. It is found from formula (A) that, if the volume V of the magnetic dot is increasing, the required nucleation field for magnetization reversal $H_{rn}$ can be suppressed while maintaining the thermal stability factor $K_n$.

In formula (A), the volume V of the magnetic dot is expressed by V=abt, where "b" is the size in the x-direction (down track direction) of the magnetic dot, "a" is the size in the y-direction (cross track direction) of the magnetic dot, and "t" is the thickness (in the case of a shape such as an ellipsoid, the volume of the ellipsoid is used as it is as the volume V). Here, a value is set to the thickness "t". FIG. 4 shows the magnetic head 11 arranged over the patterned magnetic recording medium. In order to increase the magnetic field exerted from the magnetic head 11 to the medium, it is necessary to make the distance between the tip surface of the magnetic pole of the head and the surface of the soft underlayer a half or less of the magnetic pole width. Thus, when the magnetic pole width is 25 nm, the thickness of the recording layer is set at 12 nm or less.

Figure 5:
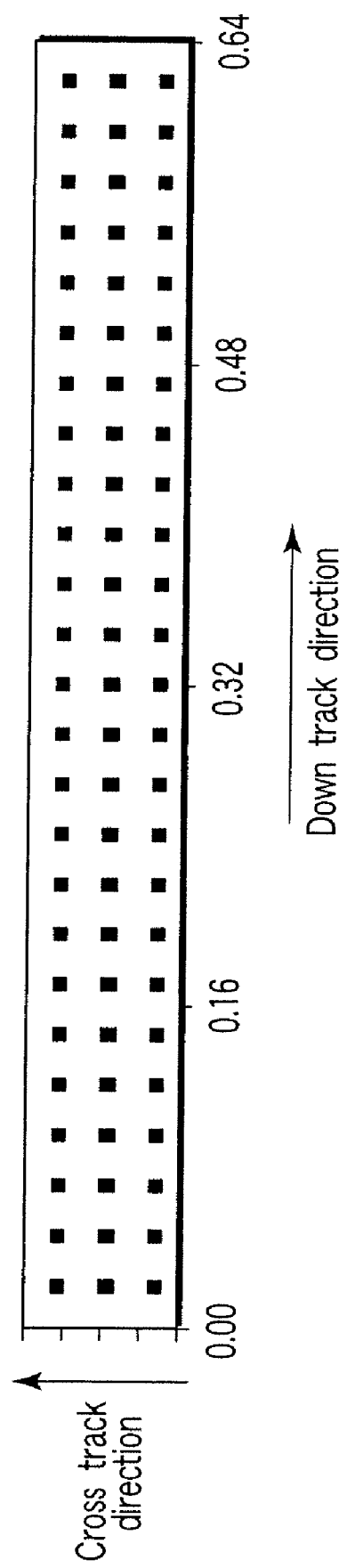
FIG. 5 is a plan view showing a patterned magnetic recording medium having square magnetic dots.

First, recording characteristics of a patterned magnetic recording medium having square magnetic dots formed therein as shown in FIG. 5 were examined by micromagnetic simulation. In the medium shown in FIG. 5, the areal recording density is set at 1 Tbit/in$^2$, i.e., the pattern periods $P_x$ and $P_y$ in the x-direction and the y-direction were set at 25 nm, and square magnetic dots each having the size "b" in the x-direction and the size "a" in the y-direction of 7.5 nm, and the thickness of 10 nm are arranged to form a square lattice. The unit of the scale shown in FIG. 5 is μm. The reason why the size "b" in the x-direction and the size "a" in the y-direction were set at 7.5 nm is that the medium having the magnetic dots of the small size is expected to suppress influence given to the adjacent tracks in recording. This particular patterned magnetic recording medium is called hereinafter the Reference Example.

The medium of the Reference Example was simulated using "Advanced Recording Model, ver. 6" available from Euxine Technologies LLC, Dayton, Ohio, USA, as described above. Each magnetic dot was divided into cubic elements having a side of 2.5 nm for modeling. It is assumed that an exchange coupling acts between the cubic elements with an exchange stiffness constant A of about $1 \times 10^{-6}$ erg/cm. This makes the simulation closer to the actual magnetization process including incoherent magnetization rotation mode in which magnetization directions are different within a dot. The parameters set to the cubic element were a saturation magnetization $M_s$ of 1,000 emu/cm$^3$, a perpendicular anisotropy field $H_k$ of 15 kOe, a dispersion thereof (standard deviation) $\sigma H_k$ of 15%, and an orientation dispersion of the anisotropic axis ($\sigma \theta$) of 2°. Under these conditions, the perpendicular remanent magnetization curve and the recorded magnetization by a single-pole head were obtained through the simulation. In this case, the soft underlayer was incorporated as a mirror imaging layer. Also, the calculation was performed using the energy balance method, with the time dependence not taken into consideration. Therefore, the resultant magnetization curve could be regarded as magnetization behavior within a short period of time corresponding to the recording process. In addition, the recorded magnetization represents the state immediately after the recording. However, since the ratio $K_n$ of the magnetic energy $E_m$ of the magnetic dot to the thermal agitation energy $k_B T$ is set at 70 or more, change of the magnetization with time caused by thermal magnetic relaxation could be neglected.

Figure 6:
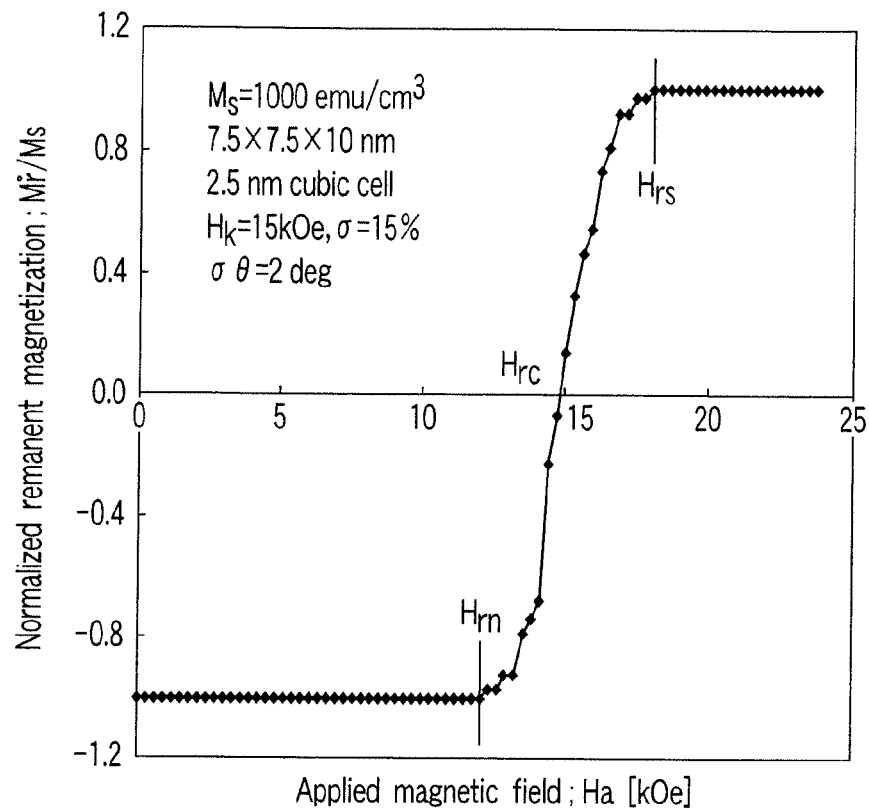
FIG. 6 is a graph for explaining the perpendicular remanent magnetization curve, the nucleation field for remanent magnetization reversal $H_{rn}$, the remanent saturation field $H_{rs}$, and the remanent coercivity $H_{rc}$, which are obtained by the simulation in the Reference Example.

FIG. 6 shows the perpendicular remanent magnetization curve obtained by the simulation. In FIG. 6, $H_{rn}$ is the nucleation field for remanent magnetization reversal, $H_{rc}$ is the remanent coercivity, and $H_{rs}$ is the remanent saturation field. It is found from FIG. 6 that the nucleation field for remanent magnetization reversal $H_{rn}$ for the medium of the Reference Example was 12 kOe.

Figure 7:
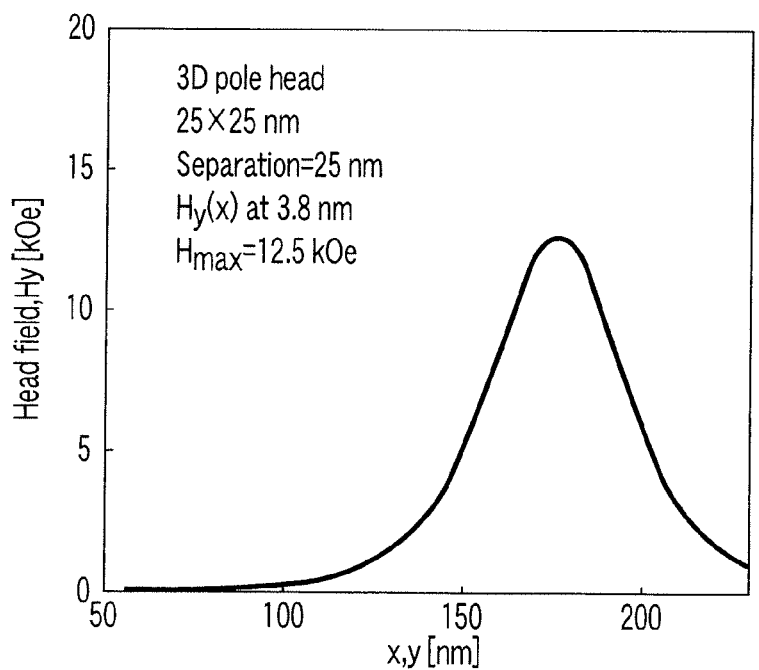
FIG. 7 is a graph showing perpendicular head field distribution in x- and y-directions used in recording simulation.

The recording characteristics of the medium for the Reference Example were examined, covering the case of using a single-pole head having a size of 25 nm×25 nm. An example of the head field is shown in FIG. 7. The magnetic field is reversed every time the magnetic head is moved by 25 nm along the center of the central track, thereby recording bit patterns with a constant period. When the magnetic field is reversed at the center between the adjacent dots, the magnetizations of the magnetic dots on the central track can be reversed one by one. In other words, it is possible to record 25 magnetization patterns at a bit length of 25 nm without error.

Next, three kinds of media having square magnetic dots (No. 1, No. 2 and No. 3), in which both the sizes "b" and "a" were varied to 12.5 nm, 15 nm or 17.5 nm, were assumed. For the three kinds of square magnetic dots, the thickness "t" was set at 5 nm, 2.5 nm and 2.5 nm, respectively, and the perpendicular anisotropy field $H_k$ was set at 15 kOe, 22 kOe and 19 kOe, respectively. The recording characteristics were examined by simulation with the other parameters set equal to those for the Reference Example. Table 1 shows the sizes of four kinds of the magnetic dots including the Reference Example and their magnetic characteristics. For these dots, the product $H_{rn}V$ of the volume V and the nucleation field for remanent magnetization reversal $H_{rn}$, which is determined from the remanent magnetization curve obtained by the simulation, was set to be 6190 nm$^3$ kOe or more in all the cases so as to satisfy the thermal stability factor $K_n$ at room temperature of 70 or more.

TABLE 1

| Dot pattern | Size [nm] | | | Volume V [nm³] | $H_{rn}$ $H_{rn}$ [kOe] | $H_k$ $H_k$ [kOe] |
| --- | --- | --- | --- | --- | --- | --- |
| | X-direction (b) | Y-direction (a) | Thickness (t) | | | |
| Reference Example | 7.5 | 7.5 | 10 | 563 | 12 | 15 |
| No. 1 | 12.5 | 12.5 | 5 | 781 | 8.4 | 15 |
| No. 2 | 15 | 15 | 2.5 | 563 | 11.4 | 22 |
| No. 3 | 17.5 | 2.5 | 2.5 | 766 | 8.4 | 19 |

Figure 8:
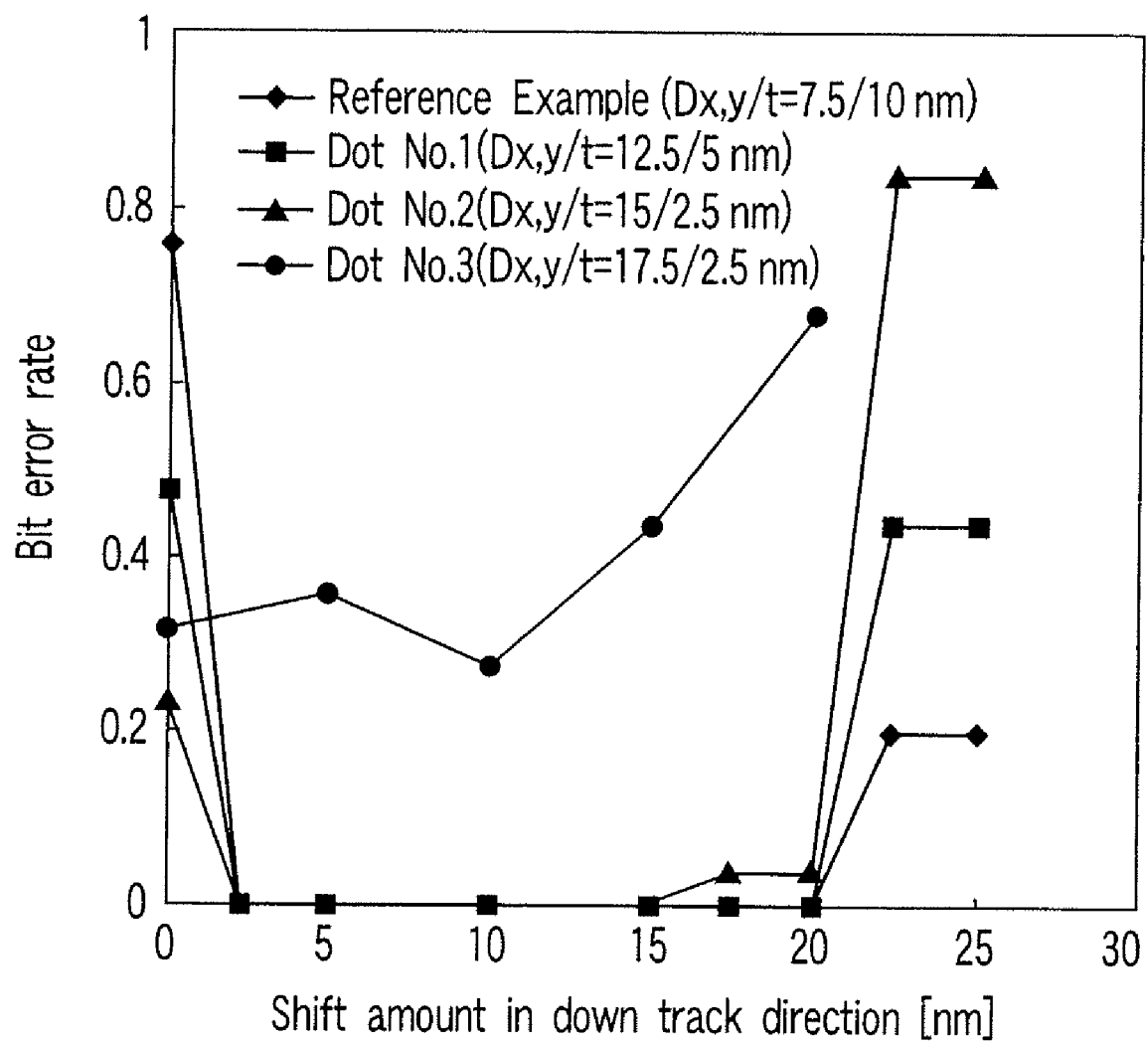
FIG. 8 is a graph showing change in recording bit error rate depending on a shift amount of a reversal position of a recording field in the down track direction with respect to the patterned magnetic recording media for the Reference Example, and Nos. 1 and 2.

Next, the patterned magnetic recording media of the Reference Example and Nos. 1 to 3 were examined for the bit error rate when the reversal position of the head field was shifted in the down track direction. FIG. 8 is a graph showing the results. In FIG. 8, the size "b" in the x-direction is denoted by $D_x$ and the size "a" in the y-direction is denoted by $D_y$ (expressions similar to those in FIG. 8 may also be employed in other drawings). As apparent from FIG. 8, if the dot size was equal to a half of the dot period (No. 1), the range of the sift amount within which zero bit error was attained was 15 nm like the Reference Example. However, if the dot size exceeded a half of the dot period, the range of the sift amount within which zero bit error was attained was narrowed for No. 2, and zero bit error was not attained at all for No. 3.

Figure 9:
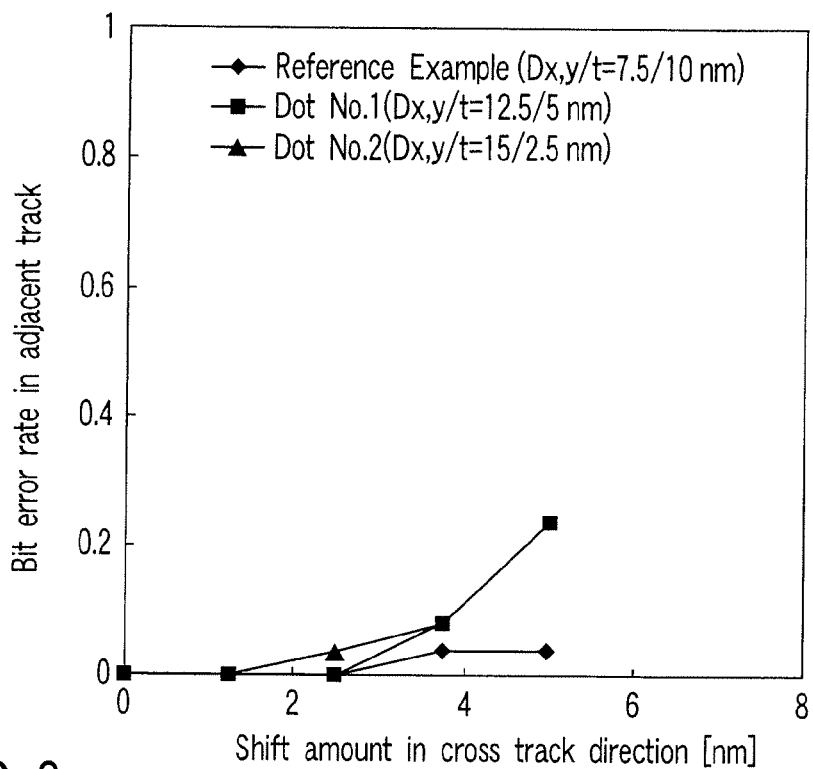
FIG. 9 is a graph showing change in bit error rate in adjacent tracks depending on the recording head position in the cross track direction with respect to the patterned magnetic recording media for the Reference Example, and Nos. 1 and 2.

Similarly, the patterned magnetic recording media of the Reference Example and Nos. 1 to 3 were examined for the bit error rate in the adjacent tracks due to magnetization reversal in the adjacent tracks when the recording field was shifted in the cross track direction. As shown in FIG. 9, the magnetizations in the adjacent tracks were affected even in the case where the shift amount of the recording field in the cross track direction was slightly larger than 2.5 nm, which means that the margin against the positional shift was as small as ±2.5 nm. Thus, the shift margin in the cross track direction was very small compared with that in the down track direction in all media including the Reference Example. It should be noted that No. 3 was excluded from FIG. 9 because zero bit error was not attained at all in the target track for No. 3 as shown in FIG. 8. It can be seen from FIG. 9 that, if the dot size "a" in the cross track direction exceeded a half of the dot period, the influence given to the adjacent tracks was also increased.

Since the shift margin in the cross track direction is small as described above, it is found that the dot size "a" in the cross track direction should be a half or less of the dot pattern period $P_y$ in the cross track direction. On the other hand, since the shift margin in the down track direction is larger than that in the cross track direction, the dot size in the down track direction can be made larger than the dot size in the cross track direction.

Figure 10:
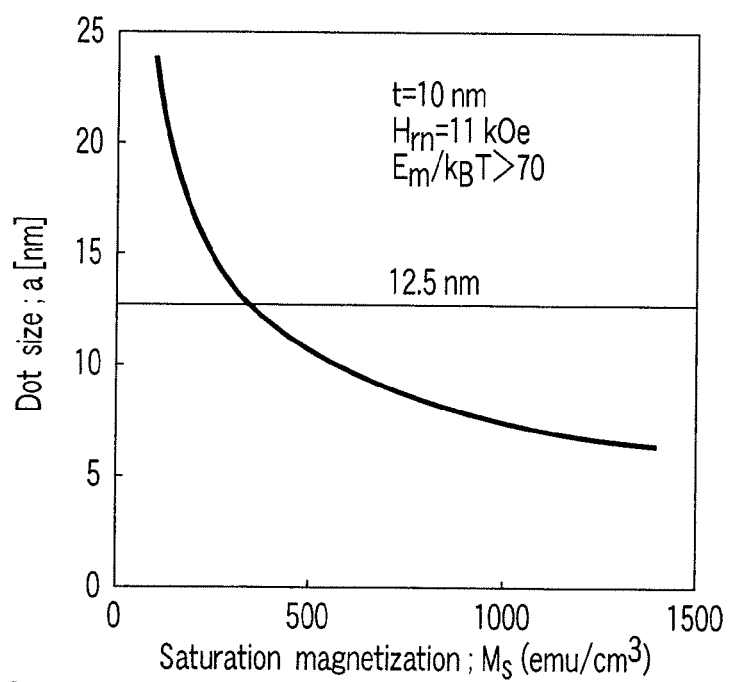
FIG. 10 is a graph showing saturation magnetization dependence of the dot size required for allowing the thermal stability factor $E_m/k_B T$ at 300 K to exceed 70, assuming that the thickness of the magnetic dot film is 10 nm and the nucleation field for remanent magnetization reversal $H_{rn}$ is 11 kOe.

Further, FIG. 10 shows the saturation magnetization $M_s$ dependence of the dot size "a" of a square dot satisfying the condition of $E_m/k_BT>70$ (T=300K) where $H_{rn}=11$ kOe. It is found from FIG. 10 that, in order to make the dot size "a" in the y-direction equal to or smaller than a half of the pattern period of 25 nm, the saturation magnetization $M_s$ should be 300 emu/cm³ or more. However, where the dot size is 7.5 nm as in the Reference Example, the saturation magnetization should be 650 emu/cm³ or more.

Figure 11:
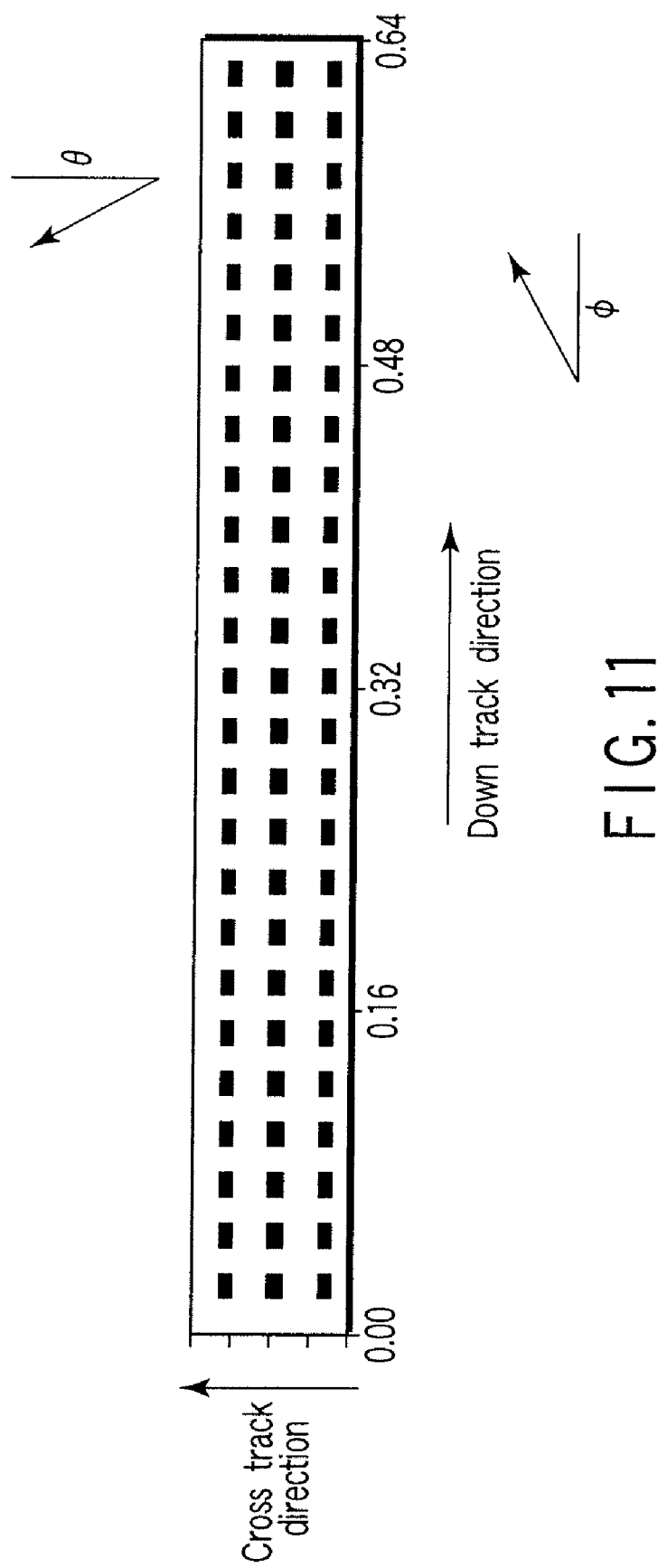
FIG. 11 is a plan view showing a patterned magnetic recording medium having anisotropic magnetic dots.

Then, taking the above results relating to the square magnetic dots into consideration, patterned magnetic recording media (Nos. 4 to 8) each having magnetic dots having an anisotropic shape such that the size "a" in the cross track direction (7.5 nm in this case as in the Reference Example) was made smaller than a half of the dot pattern period $P_y$ in the cross track direction, and that the size "b" in the down track direction was set at 12.5 to 22.5 nm, which was larger than the size "a" in the cross track direction were assumed, and their recording characteristics were examined by micromagnetic simulation. FIG. 11 schematically shows the patterned magnetic recording medium No. 5 having anisotropic magnetic dots sized at 7.5 nm×15 nm, which was used for the simulation. The unit of the scale shown in FIG. 11 is μm. The conditions for the simulation except the dot shapes were same as those given above. Table 2 shows the dot sizes and the magnetic properties of six kinds of the patterned magnetic recording medium including the Reference Example:

TABLE 2

| Dot pattern | Size [nm] | | | Volume V [nm³] | $H_{rn}$ $H_{rn}$ [kOe] | $H_k$ $H_k$ [kOe] |
| --- | --- | --- | --- | --- | --- | --- |
| | X-direction (b) | Y-direction (a) | Thickness (t) | | | |
| Reference Example | 7.5 | 7.5 | 10 | 563 | 12 | 15 |
| No. 4 | 12.5 | 7.5 | 10 | 938 | 7.2 | 10 |
| No. 5 | 15 | 7.5 | 5 | 563 | 11.4 | 19 |
| No. 6 | 17.5 | 7.5 | 5 | 656 | 10.2 | 18 |
| No. 7 | 20 | 7.5 | 5 | 750 | 9.6 | 17 |
| No. 8 | 22.5 | 7.5 | 5 | 844 | 8.1 | 16 |

Based on the results of the simulation, the relationship between the dot size and volume V and the nucleation field for magnetization reversal $H_{rn}$ will be evaluated for Nos. 4 to 8 relative to the Reference Example.

The Reference Example and No. 4 will be compared. In No. 4, the dot size in the x-direction is changed to 12.5 nm without changing the dot size in the y-direction and the thickness for the Reference Example. No. 4 has a volume about 1.67 times (5/3) as large as that of the Reference Example and, thus, can reduce the nucleation field for magnetization reversal $H_{rn}$ required for ensuring the thermal magnetic stability from 12 kOe to 7.2 kOe. In the case of setting the size "b" in the down track direction at a value larger than the size "a" in the cross track direction in such a manner, since the dot area is made about b/a times as much as that in the case where the dot sizes both in the x- and y-directions are set at "a" equally, the dot volume is increased with increase in the dot area. It follows that the thermal magnetic stability is not changed even if the nucleation field for remanent magnetization reversal $H_{rn}$ is reduced in an amount corresponding to the increase in the dot volume.

The Reference Example and Nos. 5-8 will be compared. In No. 5, the size of the dot in the x-direction is changed to 15 nm, which is two times as much as that for the Reference Example, and the thickness is set at a half of that for the Reference Example without changing the size in the y-direction of the dot for the Reference Example. Although No. 5 has a half thickness of that for the Reference Example, it retains the same volume as that of the Reference Example and can prevent increase in the nucleation field for remanent magnetization reversal $H_{rn}$. Nos. 6 to 8 are intended to take similar values of $H_{rn}$ as much as possible by setting their volumes similarly. Also in these cases, since the dot area is about b/a times as much as that in the case where the dot sizes both in the x- and y-directions are set at "a", the thickness can be decreased while substantially maintaining the original volume so as to make it possible to increase the magnetic field exerted from the magnetic head to the medium.

Figure 12:
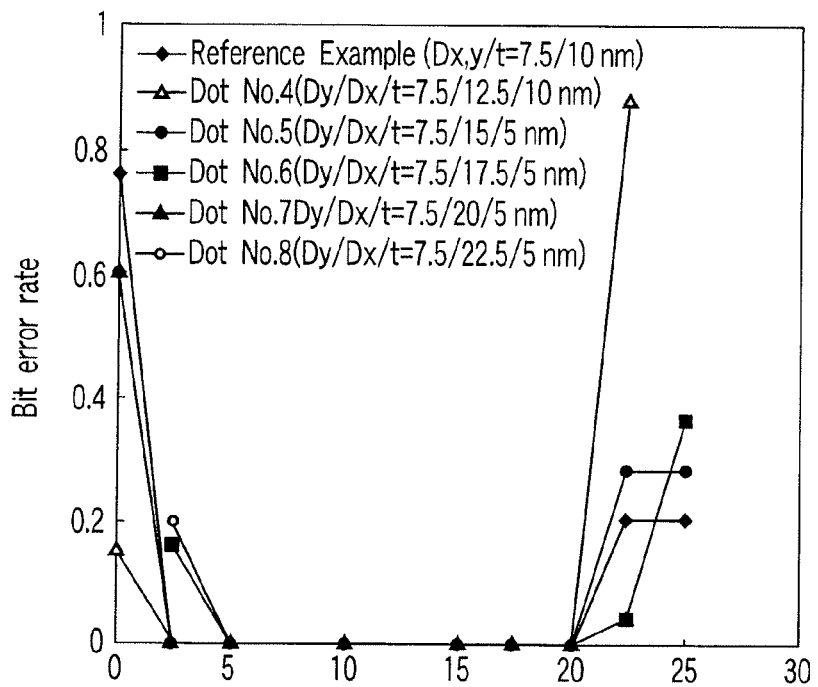
FIG. 12 is a graph showing change in recording bit error rate depending on a shift amount of a reversal position of a recording field in the down track direction with respect to the patterned magnetic recording media for the Reference Example and Nos. 4 to 8.

Recording was performed in each of the patterned magnetic recording media having anisotropic magnetic dots of Nos. 4 to 8 shown in Table 2 using a single-pole head having the same pole size as that described above. FIG. 12 shows change in bit error rate when a reversal position of magnetic field was shifted in the down track direction in recording signals with a bit length of 25 nm along the center of the central track. No. 4 retains the shift margin of 15 nm in the down track direction as in the Reference Example though it has the thickness equal to that for the Reference Example and the size in the down track direction is increased to 12.5 nm so as to increase the volume. That is, No. 4 can lower the nucleation field for remanent magnetization reversal $H_{rn}$ required for ensuring the thermal magnetic stability to 7.2 kOe and can lower the required recording field without the shift margin changed. No. 5 retains the shift margin of 15 nm in the down track direction as in the Reference Example, though it has the size in the down track direction two times as much as that for the Reference Example and the thickness set at 5 nm, which is a half of the value for the Reference Example, so as to make the volume equal to that of the Reference Example. In this case, the spacing between the tip of the write head and the soft underlayer of the recording medium is decreased in accordance with decrease in the dot thickness, with the result that a high recording field is likely to be exerted to the medium so as to facilitate the design of the head. Nos. 6 to 8 have the thickness equal to that for No. 5 and larger dot size "b" relative to No. 5, and thus have a larger volume and lower $H_{rn}$. As shown in FIG. 12, the decrease in the shift margin was only 2.5 nm in these cases.

Figure 13:
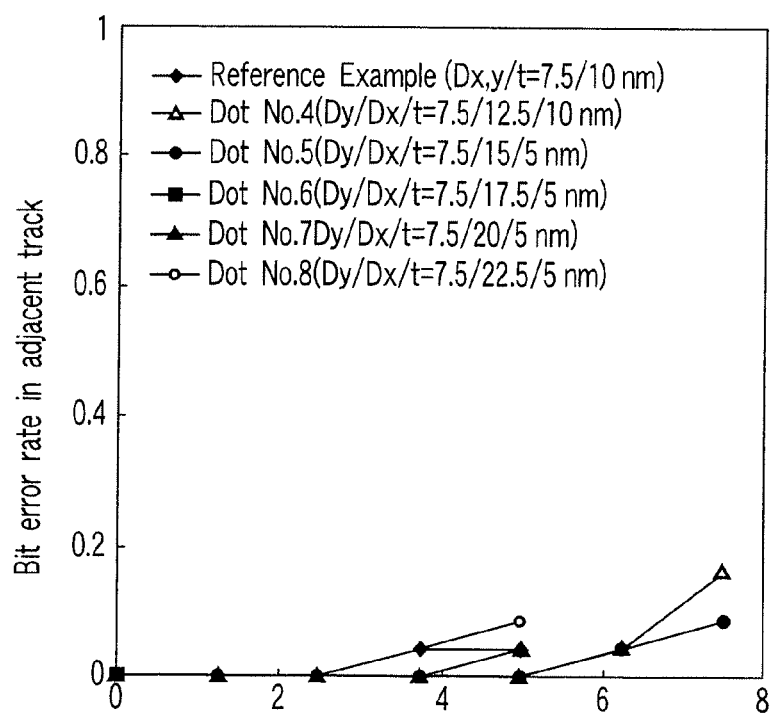
FIG. 13 is a graph showing change in bit error rate in adjacent tracks depending on the recording head position in the cross track direction with respect to the patterned magnetic recording media for the Reference Example and Nos. 4 to 8.

Further, the patterned magnetic recording media of the Reference Example and Nos. 4 to 8 were examined for influence in the adjacent tracks. As shown in FIG. 13, it is found that in any anisotropic dot can provides a shift margin not smaller than that for the Reference Example.

Figure 14:
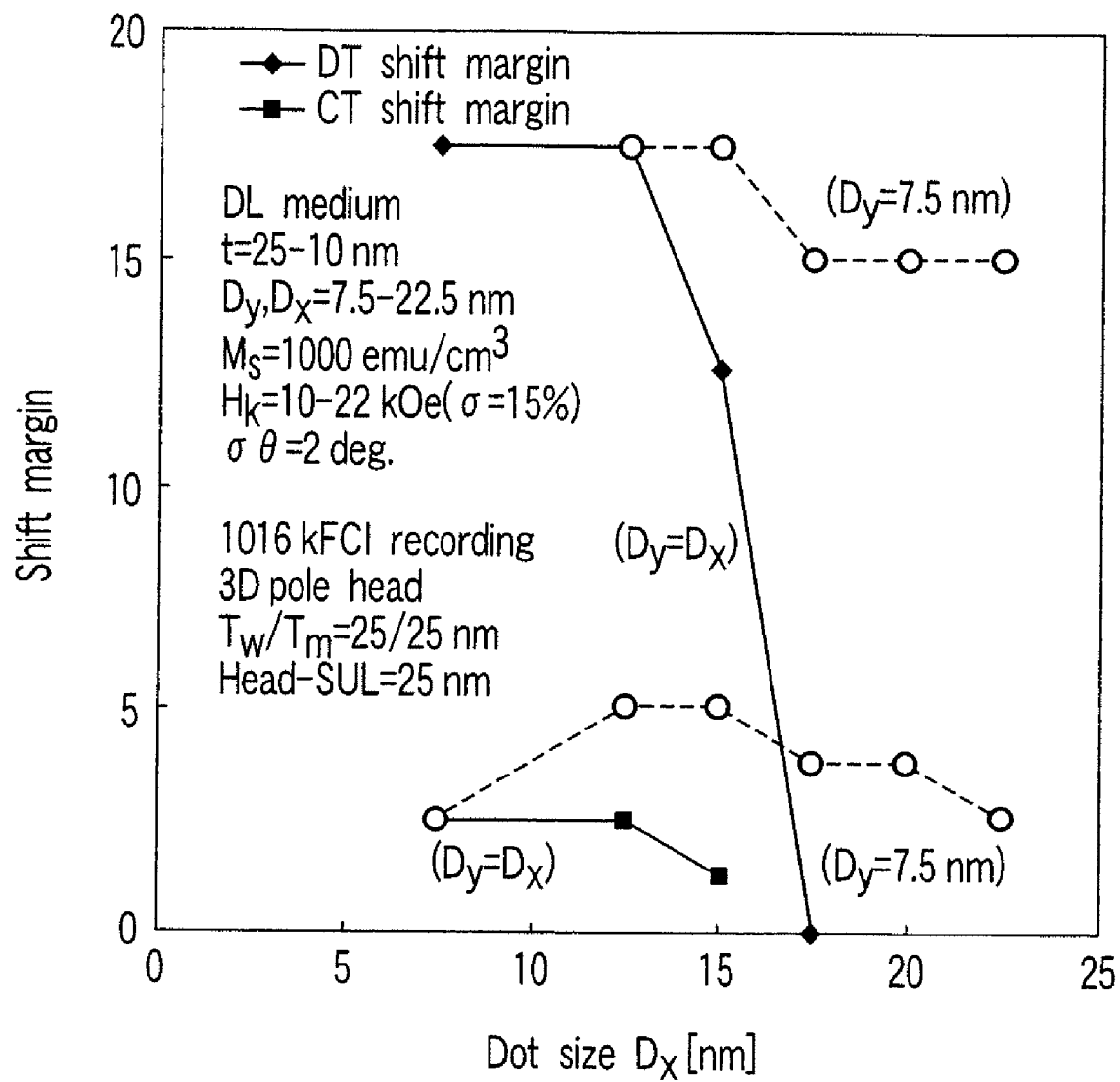
FIG. 14 is a graph showing dot size dependence of shift margin in the down track direction and in the cross track direction with respect to the patterned magnetic recording media for the Reference Example and Nos. 1 to 8.

FIG. 14 shows dot size dependence of the shift margins in the down track and cross track directions with respect to the magnetic dots shown in Tables 1 and 2 collectively. In FIG. 14, the solid lines denote square dots and the broken lines denote anisotropic dots. In the case of the square dots, the shift margin in the down track direction is rapidly lowered with increase in the dot size. On the other hand, in the case of the anisotropic dots, the shift margin in the down track direction can substantially be retained even if the dot size is increased. In the case of the square dots, the shift margin in the cross track direction is substantially constant regardless of the dot size. In the case of the anisotropic dots, however, the shift margin in the cross track direction can be increased to one to two times as much as that for the Reference Example depending on the dot size. Incidentally, the shift margin in the cross track direction for the No. 8 is equal to that for the Reference Example. However, No. 8 is advantageous in that the thickness can be made a half of that for the Reference Example, and that the nucleation field for magnetization reversal $H_{mrn}$ can be lowered to 70% or less compared to the Reference Example as shown in Table 2. In short, in the case of using anisotropic magnetic dots, it is possible to maintain the thermal magnetic stability and the shift margin in the down track direction as well as to make the shift margin in the cross track direction one to two times as much as that in the case of using square magnetic dots, while it is possible to reduce the nucleation field for magnetization reversal $H_{rn}$ so as to make the media easy to be recorded or it is possible to reduce the thickness so as to make the magnetic field from the write head easy to be exerted to the media.

Figure 15:
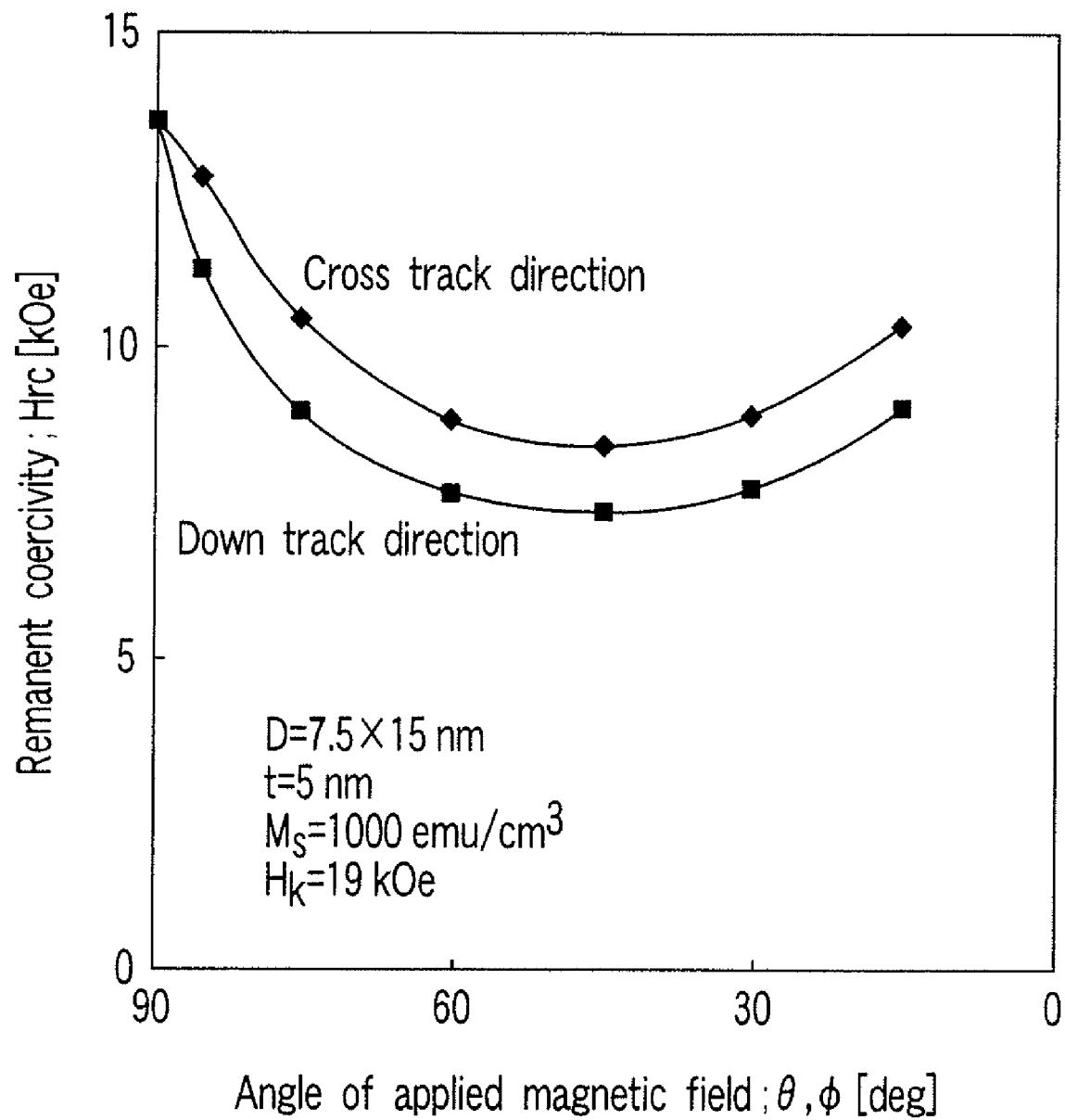
FIG. 15 is a graph showing applied field angle dependence in the down track direction and in the cross track direction with respect to a patterned magnetic recording medium having anisotropic magnetic dots.

The reason why the shift margin is increased in the case of using magnetic dots elongated in the down track direction as described above. FIG. 15 shows the relationship between the angles θ and φ (deg) of the applied magnetic field and the remanent coercivity $H_{rc}$ (kOe) (where the dot size is 7.5 nm×15 nm×5 nm). The angles θ and φ of the applied magnetic field denote the inclinations of the applied magnetic field in the cross track direction and the down track direction, respectively, as shown in FIG. 11. As apparent from FIG. 15, in the patterned magnetic recording medium including anisotropic magnetic dots, dependence on the applied magnetic field angle of the remanent coercivity $H_{rc}$ differs in the cross track direction and in the down track direction with each other. To be more specific, if the magnetic dot has an anisotropic shape, $H_{rc}$ is lowered in the down track direction so as to facilitate recording, while $H_{rc}$ is increased in the cross track direction so as to inhibit the magnetization reversal in the adjacent tracks, with the result that the shift margin in the cross track direction is increased. This particular effect is enhanced with increase in the degree of anisotropy in the shape of the magnetic dot, i.e., the effect is enhanced with increase in the aspect ratio of the dot shape and with increase in the saturation magnetization $M_s$ of the magnetic dot material. In other words, it is possible to further increase the shift margin in the cross track direction, in which the write head does not cause recording in the adjacent tracks, as the dot size "b" in the x-direction is increased relative to the dot size "a" in the y-direction. Incidentally, rectangular magnetic dots are exemplified as the anisotropic dots in the Examples of the present invention. However, the anisotropic magnetic dots are not limited to rectangular dots, and may be elliptical or semi-circular as long as the size of the dot in the down track direction differs from that in the cross track direction. The effect produced by the anisotropic shape of the dot can be estimated easily by regarding the dot shape as an ellipsoid. See Soshin Chikazumi, "Physics of ferromagnetic material (first volume)", published by Shokabo, Tokyo, 1978, page 15, which has been already cited. In addition, since the shift margin in the down track direction is relatively large, it is possible to reduce the pattern period in the down track direction so as to increase the recording density.

As described above in the present Examples, it is possible to provide a patterned magnetic recording medium that a magnetic dot pattern which achieves a desired recording density can provide the thermal magnetic stability, recording facility and a wide shift margin of the write head in the cross track direction in recording, by designing the magnetic dots in the patterned magnetic recording medium such that the dot size "a" in the y-direction (cross track direction) is set to $P_y/2$ or less (where $P_y$ is the dot pattern period in the y-direction) and the dot size "b" in the x-direction (down track direction) is made larger than the dot size "a". Regarding the shape anisotropy of the magnetic dot, if the ratio b/a of the dot size "b" in the down track direction to the dot size "a" in the cross track direction is 1.15 or more, an effect of 10% or more can be expected. On the other hand, the ratio b/a is limited to 3 or less even in the case where "a" is made smaller than $P_y/3$.

What is claimed is:
1. A method of designing a patterned magnetic recording medium comprising a magnetic film with perpendicular magnetic anisotropy which is patterned into dots, comprising steps of:

setting values to dot pattern periods $P_x$ and $P_y$ in an x-direction and in an y-direction, a thickness "t", a thermal stability factor $K_n$, a minimum inter-dot spacing $S_0$, and a maximum recording field $H_m$;

setting an initial value to a saturation magnetization $M_s$;

finding a dot size "a" in the x-direction and a nucleation field for magnetization reversal $H_n$ in accordance with the formulas given below:

$a = P_x - S_0$, $H_n = 2K_n * k_B T / (a^2 * M_s * \gamma * t)$, where $k_B$ is the Boltzmann constant, T is an absolute temperature, and γ is a ratio of the dot size in the y-direction to the dot size in the x-direction;

finding an inclination α of a perpendicular M-H loop of the magnetic dot with a shape of (a, γa, t) in accordance with the formula given below:

$\alpha = 4\pi / (N_d + \Delta H_c / M_s)$, where $N_d$ is a perpendicular demagnetizing factor of the magnetic dot, and $\Delta H_c$ is a distribution broadening of a coercivity $H_c$ in the patterned magnetic recording medium, and estimating the coercivity $H_c = H_n + (4\pi M_s / \alpha)$ and a saturation field $H_s = H_n + (8\pi M_s / \alpha)$; and judging whether the saturation field $H_s$ is lower than the maximum recording field $H_m$, and, if the saturation field $H_s$ is not lower than the maximum recording field $H_m$, increasing the value of the saturation field $M_s$ and repeating the steps given above, thereby determining the dot pattern periods $P_x$ and $P_y$ in the x-direction and in the y-direction required for achieving a desired recording density, the thickness "t", the thermal stability factor $K_n$, the minimum inter-dot spacing $S_0$, and magnetic properties of $M_s$, $H_n$ and $H_c$ satisfying the condition of the maximum recording field $H_m$.

2. A patterned magnetic recording medium designed by the designing method according to claim 1 and including magnetic dots with perpendicular magnetic anisotropy which are patterned to form a recording track, wherein the magnetic dot has a thickness "t" of 15 nm or less, a dot size "a" in a cross track direction of a half or less of a dot pattern period, a saturation magnetization $M_s$ higher than 650 emu/cm³, a saturation field $H_s$ lower than 18 kOe, and a nucleation field for magnetization reversal $H_n$ (Oe) satisfying the relationship given below:

$H_n \geq 4.2 \times 10^4 k_B / M_s V$, where $k_B$ is the Boltzmann constant (erg/deg) and V is a volume (cm³) of the magnetic dot.

3. The patterned magnetic recording medium according to claim 2, wherein the magnetic dot has an anisotropic shape such that a dot size "b" in a down track direction is larger than the dot size "a" in the cross track direction.

4. The patterned magnetic recording medium according to claim 3, wherein the magnetic dot satisfies a condition that a ratio b/a of the size "b" in the down track direction to the size "a" in the cross track direction is in a range of $1.15 \leq b/a \leq 3$.

5. The patterned magnetic recording medium according to claim 2, wherein the magnetic dot is formed of a Co—Pt alloy or a Fe—Pt ordered alloy.

* * * * *